United States Patent
Wang et al.

(10) Patent No.: US 7,564,901 B2
(45) Date of Patent: Jul. 21, 2009

(54) METHOD AND APPARATUS FOR PROVIDING RATE CONTROL FOR PANEL-BASED REAL-TIME VIDEO ENCODER

(75) Inventors: Limin Wang, San Diego, CA (US); Jian Zhou, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 254 days.

(21) Appl. No.: 11/539,786

(22) Filed: Oct. 9, 2006

(65) Prior Publication Data

US 2008/0084928 A1    Apr. 10, 2008

(51) Int. Cl.
*H04N 7/18*    (2006.01)
(52) U.S. Cl. .............................. 375/240.03; 374/240.04; 374/240.06
(58) Field of Classification Search ................................ 375/240.01–240.29
See application file for complete search history.

(56) References Cited

U.S. PATENT DOCUMENTS 5,986,712 A * 11/1999 Peterson et al. ......... 375/240.14

* cited by examiner

*Primary Examiner*—Andy S Rao
(74) *Attorney, Agent, or Firm*—Stewart M. Wiener

(57) ABSTRACT

A method and apparatus for providing multi-panel rate control of real-time video digital encoders such as an MPEG or H series including the steps of bit allocation, rate control and adaptive quantization. Bit allocation assigns a target number of bits per group of pictures, and per picture of each type. Rate control adjusts the quantization parameter at the MB level to achieve that target number of bits per picture. Adaptive quantization further modulates the parameter per MB using local activity measure. Bit allocation and rate control can be implemented through a central control unit, or a central digital signal processor (DSP) while adaptive quantization can be implemented at the local panel.

38 Claims, 7 Drawing Sheets

Real-time Video Encoding System

Real-time Video Encoding System

Multiple Panels Per Picture

METHOD AND APPARATUS FOR PROVIDING RATE CONTROL FOR PANEL-BASED REAL-TIME VIDEO ENCODER

BACKGROUND

1. Field

The present disclosure relates generally to the field of video data processing, and, more particularly, to a multi-panel rate control method for real-time digital video encoders such as an MPEG-4 or an H series encoder.

2. Related Art

Video signals generally include data corresponding to one or more video frames, where each video frame is composed of an array of picture elements (pels). A typical color video frame at standard resolution can be composed of over several hundred thousand pel arranged in an array of blocks. Since each pel has to be characterized with a color (or hue) and luminance characteristics, these data may be represented with groups of four luminance pel blocks and two chrominance pel blocks called macroblocks (MBs). Thus, digital signals representing a sequence of video frame data, usually containing many video frames, have a large number of bits. However, the available storage space and bandwidth for transmitting such signals is limited. Therefore, compression processes are used to more efficiently transmit or store video data.

Compression of digital video signals for transmission or for storage has become widely practiced in a variety of contexts, especially in multimedia environments for video conferencing, video games, Internet image transmissions, digital TV and the like. Coding and decoding are accomplished with coding processors which may be general computers, special hardware or multimedia boards and other suitable processing devices.

Compression processes typically involve quantization, in which sampled video signal data values are represented by a fixed number of redefined quantizer values. The quantized signal is composed of quantizer values that are approximations of the sampled video signal. Therefore, the encoding of the video signal data onto a limited number of quantizer values necessarily produces some loss in accuracy during the decoding process.

SUMMARY

The following disclosure describes embodiments of a method which provides an improved video digital data compression capable of adjusting the quantization parameter to achieve an improved coding and decoding process. This method may employ an encoder having a panel based architecture with a digital signal processor to handle one or several rows of MB in lieu of frame-by-frame, thereby, allowing a greater number of frames to be processed. Various embodiments of this method further have the capability of handling both frame and field pictures as opposed to one mode of picture such as frame pictures.

The embodiments may perform several steps including bit allocation, rate control and adaptive quantization. Bit allocation assigns a target number of bits per group of pictures, and per picture of each type. Rate control adjusts the quantization parameter at the MB level to achieve that target number of bits per picture. Adaptive quantization further modulates the parameter per MB using a local activity measure. Bit allocation and rate control can be implemented through a central control unit, or a central digital signal processor (DSP) while adaptive quantization can be implemented at the local panel.

One encoder employing the method may have a central DSP and several panels, each with its own DSP. During the process of encoding, a whole frame is divided into multiple slices which are processed in parallel by the DSPs at the multiple panels.

An embodiment capable of implementing the present disclosure may be a video data encoding apparatus comprising of a processor, an input/output device, a memory, and a video encoding module capable of performing bit allocation by assigning a target number of bits per GOP, rate control by adjusting the quantization parameter QP to achieve said target number of bits, and adaptive quantization by modulating the quantization parameter using the local activity measure. Such embodiment shall have the capability of performing scene changes within a GOP, and also the ability to check and adjust the target number of bits assigned for a picture I, P or B in order to prevent the system from overflowing and underflowing.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION OF THE PREFERRED EMBODIMENTS

The following detailed description is not to be taken in a limiting sense, but is made merely for the purpose of illustrating general principles of embodiments of the present disclosure. The scope of the present disclosure is best defined by the appended claims.

Figure 1:
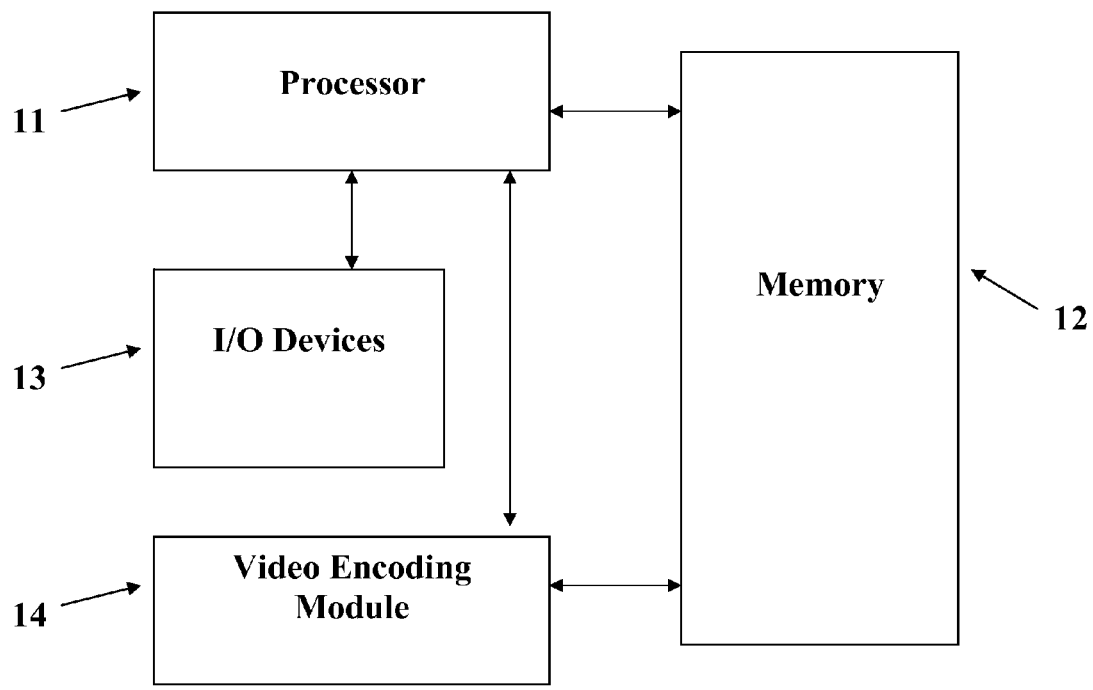
FIG. 1 illustrates a block diagram of a real-time video encoding system.

FIG. 1 illustrates a block diagram of a real-time video encoding system 10. Specifically, the real-time video encoding system 10 may be employed to compress video data on a panel-based architecture using a multi-panel control process as hereafter described. Such an encoder 10 may comprise, for example, an MPEG-4 AVC encoder.

In one embodiment, the real-time video encoder system 10 is implemented on a general-purpose computer or any other hardware equivalent. Thus, the real-time video encoder system 10 may comprises a processor (CPU) 11, memory 12, e.g., random access memory (RAM) and/or read only memory (ROM), video encoding module 14, and various input/output devices 13, (e.g., storage devices, including but not limited to, a tape drive, a floppy drive, a hard disk drive or a compact disk drive).

It should be understood that the video encoding module 14 may be implemented as one or more physical devices that are coupled to the processor 11 through a communication channel. Alternatively, the video encoding module 14 may be represented by one or more software applications or with a combination of software and hardware, e.g., using application specific integrated circuits (ASIC), where the software is loaded from a storage medium, (e.g., a magnetic or optical drive or diskette) into memory 12 and operated on by the processor 11 of the video encoding module 14. As such, the video encoding module 14 (including associated data structures) of the present embodiment may be stored on a computer readable medium, e.g., RAM memory, magnetic or optical drive or diskette or the like.

Figure 2:
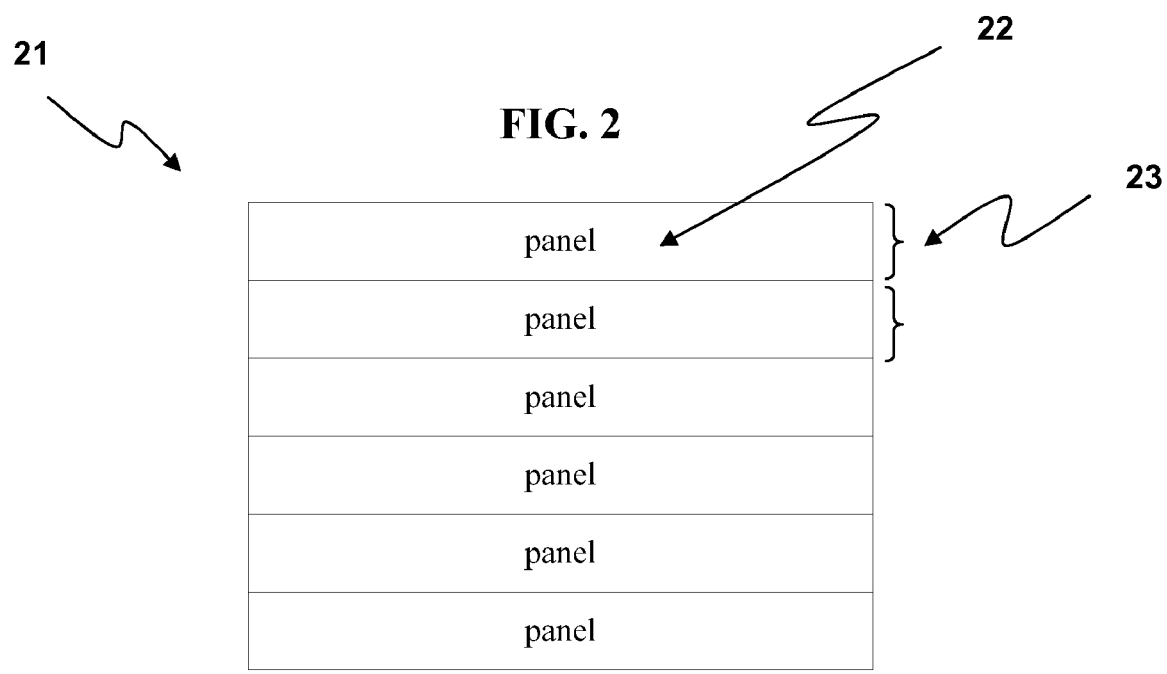
FIG. 2 illustrates a multi-panel architecture for processing a whole picture.

Real-time video encoders may have a multi-panel architecture for processing a whole picture. In such an architecture, a picture 21 is divided into several slices 22, and each panel 23 processes one of these slices 22, as shown in FIG. 2. Each of these multiple panels has its own DSP that enables the slices 22 to be processed in parallel at these panels 23.

Figure 3:
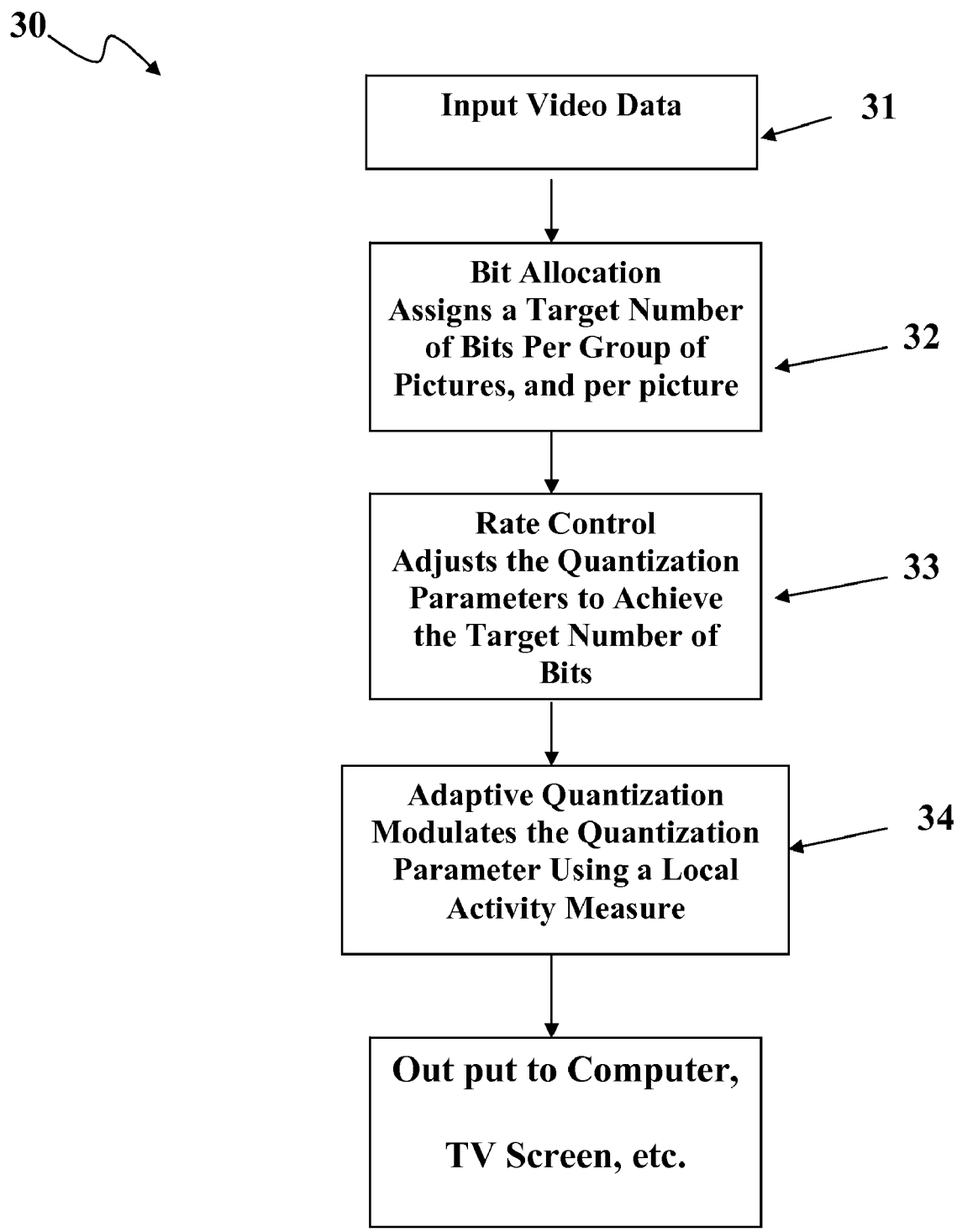
FIG. 3 illustrates a flowchart of a rate control process used by the real-time video encoding module.

FIG. 3 illustrates a flow chart of a rate control process 30 for real-time video encoding using a multi-panel based architecture. In one embodiment, the process 30 is performed by a real-time video encoder such as a MPEG-4 encoder. The process 30 starts with the reception of video input data 31 by a video encoder. The input video data is processed using a rate control method consisting of three main steps: (a) bit allocation 32, (b) rate control 33 and (c) adaptive quantization 34. Bit allocation 32 assigns a target number of bits per group of pictures, and per picture of each type. Rate control 33 adjusts the quantization parameter at the MB level to achieve that target number of bits per picture. Adaptive quantization 34 further modulates the parameter per MB using a local activity measure. The steps of bit allocation 32 and rate control 33 can be implemented through a central control unit, or a central DSP, while the step of adaptive quantization 34 can be implemented at the local panel. An exemplary encoder using a multi-panel rate control method such as an MPEG-4 has components capable of performing bit allocation 32, rate control 33, and adaptive quantization 34.

Figure 4:
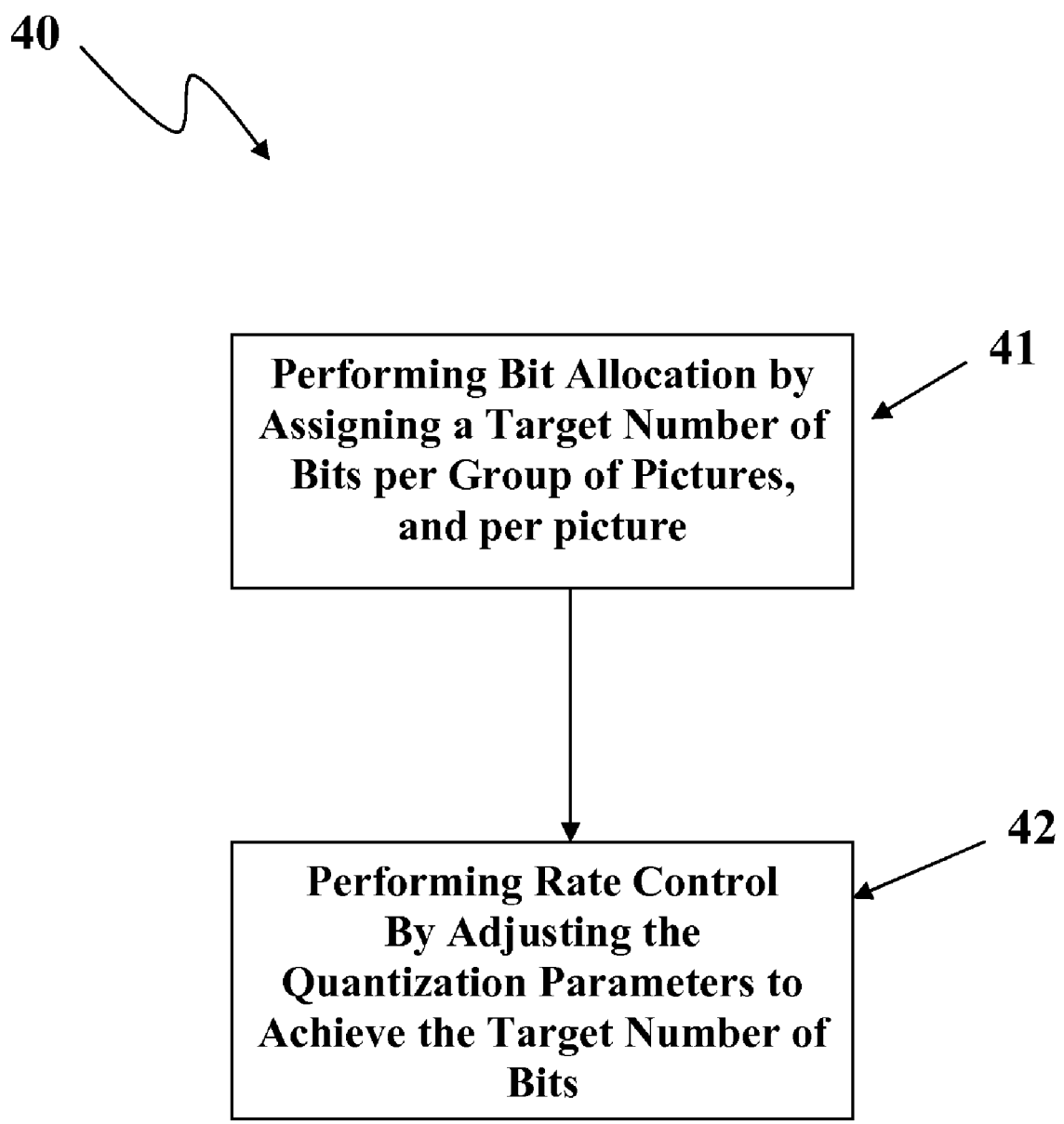
FIG. 4 illustrates a flowchart of another embodiment of a rate control process used by the real-time video encoding module.

FIG. 4 illustrates a flowchart of another embodiment of a rate control process 40 for real-time video encoder wherein bit allocation is performed at a process block 41 and rate control is performed at a process block 42 are performed. At the process block 41, bit allocation is performed by assigning a target number of bits per group of pictures. Further, at the process block 42, rate control is performed by adjusting the quantization parameters to achieve the target number of bits. In one embodiment, both bit allocation and rate control are implemented by a central DSP of a real-time video encoder.

In one embodiment, it is assumed in the following that a picture can be of type intra picture (I), predictive coded picture (P), or bi-directional predictive coded picture (B).

Figure 5:
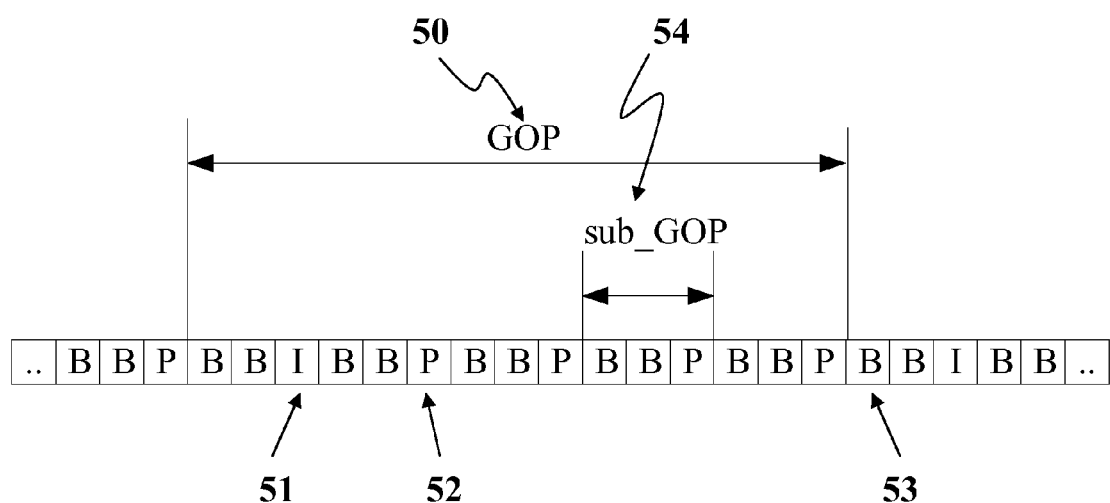
FIG. 5 illustrates a representation of how an input video sequence is grouped into "Groups of Pictures" (GOPs).

With respect to first main step of bit allocation 32, pictures of the input video sequence are grouped into GOPs. A GOP 50 may contain one I picture 51 and a few P pictures 52, as shown in FIG. 5. There may be one or more B pictures 53 between I and/or P pictures 51, 52. A group of successive B pictures 53 plus the following I or P picture is called sub_GOP 54. A GOP 50 can be described by the number of pictures per GOP 50 and per sub_GOP 54, that is, the GOP length, $N_{GOP}$, and the sub_GOP length, $N_{sub\_GOP}$. The central DSP allocates a bit budget per GOP and per picture.

Target Rate Per GOP: Given a target bit rate of bit_rate in bits per second and a picture rate of pic_rate in pictures per second, a GOP 50 of $N_{GOP}$ pictures is budgeted a nominal number of bits as $$R_{GOP\_nominal} = N_{GOP} \times \frac{bit\_rate}{pic\_rate}.$$

At the beginning of a GOP 50, the central DSP calculates a target number of bits, $R_{GOP\_remaining}$, for the GOP 50 as $R_{GOP\_remaining} = R_{GOP\_remaining} + R_{GOP\_nominal}$, where $R_{GOP\_remaining}$ on the right is the number of bits left over from the previous GOP 50. For the first GOP 40 of a sequence, $R_{GOP\_remaining}$ on the right is set to 0 bits.

Target Rate Per Picture: Given a target number of bits for a GOP 50, $R_{GOP\_remaining}$, the central DSP needs to assign a picture of pic_type I, P or B a target number of bits, $T_{Pic\_type}$, according to its relative complexity measure, $C_{Pic\_type}$, over other pictures within the GOP 50.

Figure 6:
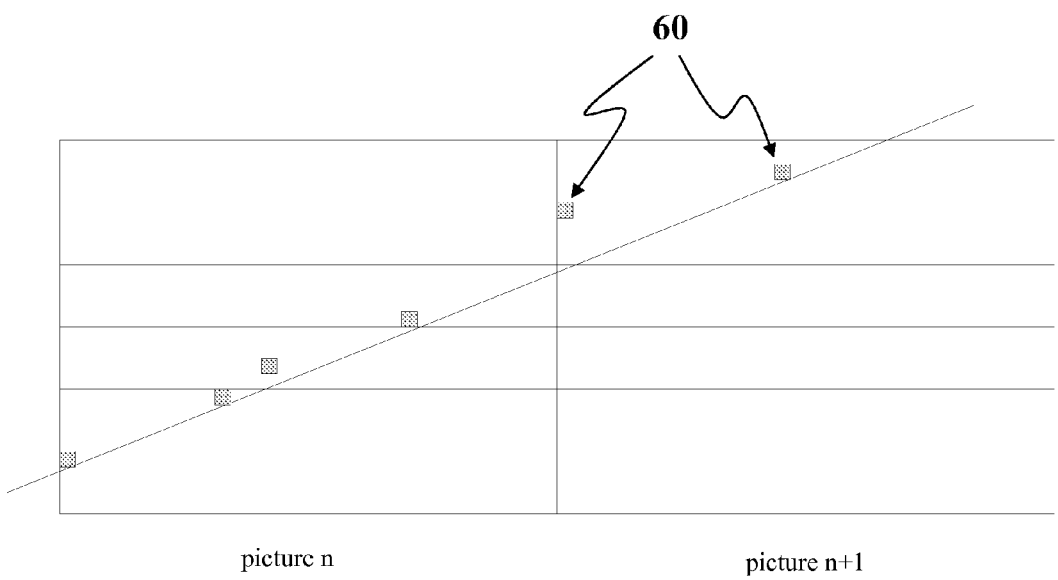
FIG. 6 illustrates a diagram of the geometric positions of MBs being processed by the panels.

For instance, in one embodiment of an encoder such as a MPEG-4 AVC |H.264, encoding a MB may require the coded information of its left and above neighbor MBs. The geometric positions of the current MBs in panels therefore may not be the same, as shown in FIG. 6, where the shaded blocks are the current MBs 60. In addition, the upper panels may complete the processing of their MBs much earlier than the lower panels, and move on to the MBs in next picture, as shown in FIG. 6. The two pictures may have different types of I, P and B. Hence, the central DSP needs to have the target numbers of bits ready for all the three picture types of I, P and B all the time.

The present method allows an interlace picture of two fields, field 0 and field 1, to be encoded as a single frame picture or as two separate field pictures. An encoder such as an MPEG encoder may allow adaptive switching between frame and field picture coding. The rate control method therefore maintains two sets of the complexity measures of pic_type I, P and B picture: one for frame pictures and one for field pictures. The target numbers of bits for frame pictures of pic_type I, P and B are set as $$T_{pic\_type} = \frac{K_{pic\_type} C_{pic\_type} R_{GOP\_remaining}}{K_I n_{frame\_I} C_{frame\_I} + K_P n_{frame\_P} C_{frame\_P} + K_B n_{frame\_B} C_{frame\_B}},$$

and the target numbers of bits for field pictures of pic_type I, P and B are set as $$T_{pic\_type} = \frac{K_{pic\_type} C_{pic\_type} R_{GOP\_remaining}}{K_I n_{field\_I} C_{field I} + K_P(n_{field0\_P} C_{field0\_P} + n_{field1\_P} C_{field1\_P}) + K_B n_{field\_B} C_{field\_B}},$$

where pic_type indicates the picture type of I, P or B for the current picture; $C_{pic\_type}$ is the complexity measure for picture of pic_type in either frame or field; $C_{frame\_I}$, $C_{frame\_P}$, and $C_{frame\_B}$ are the complex measures for frame pictures of pic_type I, P and B, respectively; $C_{field\_I}$, $C_{field0\_P}$, $C_{field1\_P}$, and $C_{field\_B}$ are the complex measures for I field, P field 0, P field 1 and B field pictures, respectively; $K_I$, $K_P$ and $K_B$ are the pre-set constants for pictures of pic_type I, P and B, respectively (for example, $K_I = K_P = 1$ and $K_B = 1/1.4$); $n_{frame\_I}$, $n_{frame\_P}$, and $n_{frame\_B}$ are the remaining numbers of I, P and B frame pictures in the current GOP; and $n_{field\_I}$, $n_{field0\_P}$, $n_{field1\_P}$, and $n_{field\_B}$ are the remaining numbers of I field, P field 0, P field 1 and B field pictures in the current GOP.

GOP Remaining Bits Updating: After encoding a picture of type I, P or B, the remaining number of bits for the current GOP is updated as $R_{GOP\_remaining} = R_{GOP\_remaining} - R_{pic\_actual}$, where $R_{pic\_actual}$ is the actual number of bits consumed for the picture.

Complexity Initialization: At the beginning of a sequence, the complex measures for frame and field pictures are initialized. For example, $$\begin{cases} C_{frame\_I} = 160 \\ C_{frame\_P} = 60 \\ C_{frame\_B} = 42, \end{cases}$$

and $$\begin{cases} C_{field\_I} = 160 \\ C_{field0\_P} = 60 \\ C_{field1\_P} = 42 \\ C_{field\_B} = 42. \end{cases}$$

After the first I and P frame pictures, the complexity measure for B frame picture is set based upon the updated complexity measures of I and P. For example, $$C_{frame\_B} = (42/60) \times C_{frame\_P}.$$

If the first I frame is coded as one I field followed by one P field, the complexity measures for P field 0 and B field pictures are set based upon the updated complexity measures of I and P. For example, $$\begin{cases} C_{field0\_P} = (60/42) \times C_{field1\_P} \\ C_{field\_B} = C_{field1\_P}. \end{cases}$$

Note that the above settings for complexity measures are implemented only once per sequence.

Complexity Updating: The complexity measure of pic_type I, P or B is defined as the product of the number of bits used for a picture of pic_type I, P or B and the associated coding distortion, D, that is, $C_{pic\_type} = R_{pic\_actual} \times D$. D can be any square distortion, for example, the mean square error. The complexity measure of pic_type I, P or B is updated after a frame or field picture of I, P or B is encoded. Note that in the real-time system, certain delays are inevitable. For example, in the proposed encoder design, the actual number of compressed bits for a given picture, $R_{pic\_actual}$, may not be available until three or four pictures later. Hence, the picture complexities used in calculating the target numbers of bits per picture in frame or field may be the ones calculated a few pictures away in the past.

Note that a picture is encoded only once, either in frame mode or in field mode. However, the complexity measures in both frame and field modes are updated. Specifically, when a picture is coded in frame mode, the complexity measures in frame mode are updated using equation $C_{pic\_type} = R_{pic\_actual} \times D$ and the complexity measures in field mode are updated using equations $$\begin{cases} C_{field\_I} = C_{frame\_I}/2 \\ C_{field0\_P} = C_{frame\_P} * 2/3 \\ C_{field1\_P} = C_{frame\_P}/3 \\ C_{field0\_B} = C_{frame\_B}/2. \end{cases}$$

When a picture is coded in field mode, the complexity measures in field mode are updated using the equations $$C_{pic\_type} = R_{pic\_actual} \times D$$

After field 1 is coded, the complexity measures in frame mode are also updated as $$\begin{cases} C_{frame\_I} = C_{field\_I} \times 2 \\ C_{frame\_P} = C_{field1\_P} \times 3 \\ C_{frame\_B} = C_{field\_B} \times 2. \end{cases}$$

Picture Number Updating: The numbers of I, P and B (frame) pictures per GOP, $N_I$, $N_P$, and $N_B$, are pre-set. For example, assume there is only one I frame in a GOP of $N_{GOP}$ and $N_{sub\_GOP}$ is not changed, $N_I$, $N_P$, and $N_B$ are set as $$\begin{cases} N_I = 1 \\ N_P = (N_{GOP}/N_{sub\_GOP}) - 1 \\ N_B = N_{GOP} - N_I - N_P. \end{cases}$$

Further assume that I in field mode is configured to be coded as two I fields, or I field 0 followed by P field 1, or P field 0 followed by I field 1, or I field 0 followed by B field 1, or B field 0 followed by I field 1, and P and B in field mode are configured as two P fields and two B fields, other configurations for P and B in field are also possible.

At the beginning of a GOP, the remaining numbers of I, P and B frame and field pictures for the current GOP are set as $$\begin{cases} n_{frame\_I} = N_I \\ n_{frame\_P} = N_P \\ n_{frame\_B} = N_B, \end{cases}$$

and if I in field mode is configured to be coded as two I fields, $$\begin{cases} n_{field\_I} = 2 \\ n_{field0\_P} = N_P \\ n_{field1\_P} = N_P \\ n_{field\_B} = 2 \times N_B \end{cases};$$

or if I in field mode is configured to be coded as I field 0 followed by P field 1, $$\begin{cases} n_{field\_I} = 1 \\ n_{field0\_P} = N_P \\ n_{field1\_P} = N_P + 1 \\ n_{field\_B} = 2 \times N_B \end{cases};$$

or if I in field mode is configured to be coded as P field 0 followed by I field 1, $$\begin{cases} n_{field\_I} = 1 \\ n_{field0\_P} = N_P + 1 \\ n_{field1\_P} = N_P \\ n_{field\_B} = 2 \times N_B \end{cases};$$

or if I in field mode is configured to be coded as one I field and one B field, $$\begin{cases} n_{field\_I} = 1 \\ n_{field0\_P} = N_P \\ n_{field1\_P} = N_P \\ n_{field\_B} = 2 \times N_B + 1 \end{cases}.$$

After a frame picture of I, P or B is encoded, the corresponding number of I, P or B pictures in the current GOP is updated in the following manner: if it is a I picture and if the I picture in field is configured to be coded as two I fields, then $$\begin{cases} n_{frame\_I} -- \\ n_{field\_I} -= 2 \end{cases};$$

or if the I picture in field mode is configured to be coded as I field 0 followed by P field 1, then $$\begin{cases} n_{frame\_I} -- \\ n_{field\_I} -- \\ n_{field\_P} -- \end{cases};$$

or if the I picture in field mode is configured to be coded as P field 0 followed by I field 1, then $$\begin{cases} n_{frame\_I} -- \\ n_{field0\_P} -- \\ n_{field\_I} -- \end{cases};$$

or if the I picture in field mode is configured to be coded as one I field and one B field, $$\begin{cases} n_{frame\_I} -- \\ n_{field\_I} -- \\ n_{field\_B} -- \end{cases};$$

else, if it is a P picture, then $$\begin{cases} n_{frame\_P} -- \\ n_{field0\_P} -- \\ n_{field1\_P} -- \end{cases}; \text{else} \begin{cases} n_{frame\_B} -- \\ n_{field\_B} -= 2 \end{cases}.$$

After field 0 of I, P, or B is encoded, the corresponding number of I, P or B pictures in the current GOP is updated in the following manner: if it is a I picture, then $n_{field\_I}\ldots$; else if it is a P picture, then $n_{field0\_P}\ldots$; else if it is a B picture then $n_{field\_B}\ldots$.

After field 1 of I, P or B is encoded, the corresponding number of I, P or B pictures in the current GOP is updated in the following manner: if it is an I picture, then $$\begin{cases} n_{frame\_I} -- \\ n_{field\_I} -- \end{cases};$$

else if it is a P picture and if field 0 is coded as I, then $n_{frame\_I}\ldots$, or if field 0 is coded as P field, then $n_{frame\_P}\ldots$; $n_{feld1\_P}\ldots$; else if it is a B picture and field 0 is coded as I, then $n_{frame\_I}\ldots$; or if field 0 is coded as B, then $n_{frame\_B}\ldots$; $n_{field\_B}\ldots$.

Scene Change Handling: In one embodiment, a proposed encoder system allows preview beyond the current GOP in handling a scene change. If a scene change occurs within a GOP and I picture in the GOP is in the new scene, no action is taken. Otherwise, the first P picture in the new scene is changed to I picture. The following process is invoked depending upon whether the first P picture in the new scene is in the first half or the second half of the GOP.

Figure 7:
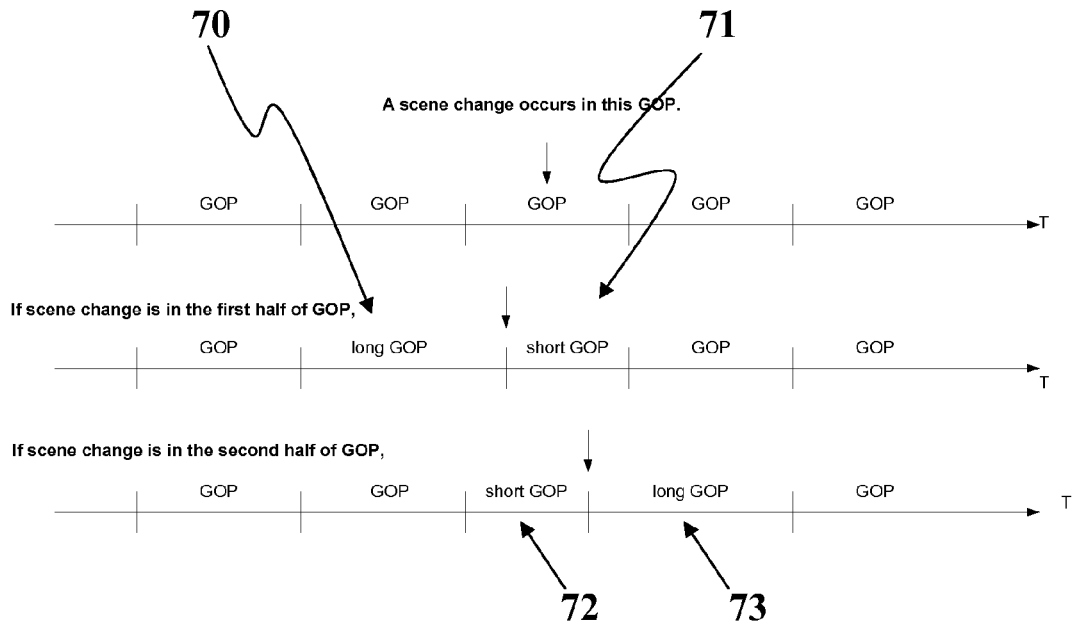
FIGS. 7 and 8 illustrate diagrams of scene changes in GOPs.

Assume that the first P picture in the new scene is the Nth picture of the GOP. If the first P picture is in the first half of GOP, the scheduled I in the GOP is changed to P picture. This creates a longer GOP 70 followed by a shorter current GOP 71, as shown in FIG. 7. The longer and the shorter GOPs 70, 71 are compensated so that the later scheduled I, P and B pictures will maintain. The longer GOP 70 is of the length equal to $N_{GOP}=N_{GOP}+(N-N_{sub\_GOP})$ and the shorter GOP 71 of the length equal to $N_{GOP}=N_{GOP}-(N-N_{sub\_GOP})$.

The corresponding numbers of I, P and B frame and field pictures for the longer and shorter GOPs 70, 71 can be calculated from the above equations using the updated GOP lengths.

The nominal number of bits for the longer GOP 70 is set as $$R_{GOP\_nominal} = R_{GOP\_nominal} + \frac{N - N_{sub\_GOP}}{N_{GOP}} \times R_{GOP\_nominal},$$

and the nominal number of bits for the shorter GOP 61 is reset as $$R_{GOP\_nominal} = R_{GOP\_nominal} - \frac{N - N_{\text{sub}\_GOP}}{N_{GOP}} \times R_{GOP\_nominal}.$$

On the other hand, if the first P in the new scene is in the second half of GOP, the scheduled I picture in the next GOP is changed to P picture. This creates a shorter GOP 72 followed by a longer GOP 73, as shown in FIG. 7. The shorter and the longer GOPs 72, 73 are compensated so that the later scheduled I, P and B pictures will maintain.

The shorter GOP 72 is of the length equal to $N_{GOP}=N-N_{\text{sub}\_GOP}$, and the longer GOP 73 of the length equal to $N_{GOP}=2\times N_{GOP}-(N-N_{\text{sub}\_GOP})$.

Similarly, the corresponding numbers of I, P and B frame and field pictures for the longer and shorter GOPs 72, 73 can be calculated from the above equations using the updated GOP lengths. The nominal number of bits for the shorter GOP 72 is reset as $$R_{GOP\_nominal} = \frac{N - N_{\text{sub}\_GOP}}{N_{GOP}} \times R_{GOP\_nominal}$$

as and the nominal number of bits for the longer GOP 73 is reset as $$R_{GOP\_nominal} = 2 \times R_{GOP\_nominal} - \frac{N - N_{\text{sub}\_GOP}}{N_{GOP}} \times R_{GOP\_nominal}.$$

Figure 8:
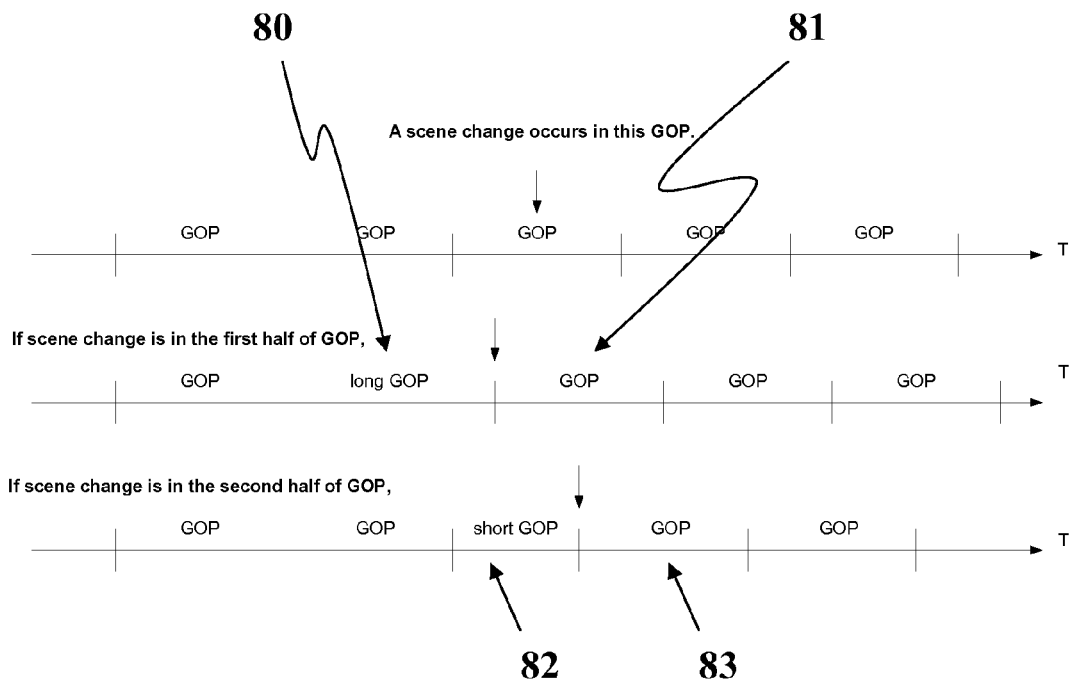

An alterative embodiment to the above embodiment which compensates the longer or the shorter GOP is described in FIG. 8 where an irregular GOP 80, 82 is followed by a regular GOP 81, 83. The longer and shorter GOP lengths are calculated in the same manner as described above. The nominal number of bits for the longer and shorter GOP are also determined in the same manner as described above. In both embodiments shown in FIGS. 7 and 8 the irregular GOP length 70, 71, 72, 73, 80, and 82 is within the range of 0.5 to 1.5 times of the regular GOP length 81, 83. The benefit of the first embodiment is that on average the same numbers of I, P and B picture can be maintained per second. On the other hand, the second embodiment may result in a variable number of I, P and B pictures per second. For example, if there are many shorter GOPs within a period of time, there are clearly more I pictures within this period than in the regular GOP case.

Rate Control: The target number of bits per frame or field may be achieved by properly selecting a value of QP per MB or a group of MBs. MPEG4 AVC |H.264 encoder, for instance, allows a total of 52 possible values in quantization parameter (QP), e.g., 0, 1, 2, . . . , 51. Given the target numbers of bits for (frame or field) pictures of pic_type I, P and B, $T_{pic\_type}$, the central DSP first determines six reference (not final) quantization parameters, $QP_{pic\_type}(t)$, at a time instant t based upon the fullness of six virtual buffers, one for each picture types of pic_type in frame or field. The virtual buffer fullness of pic_type I, P or B in frame or field at time t is computed as $$d_{pic\_type}(t) = d_{pic\_type}(0) + \alpha_{pic\_type} \times B_{pic\_type}(t) - \frac{MB_{pic\_type}(t)}{MB_{pic}} T_{pic\_type}.$$

is the initial virtual buffer fullness at the beginning of the picture of pic_type I, P or B in frame or field. The final virtual buffer fullness of the current picture, $d_{pic\_type}(T)$, is used as $d_{pic\_type}(0)$ for the next picture of the same frame or field pic_type. $MB_{pic\_type}(t)$ is the number of MBs that have been processed among all the panels in the picture of pic_type up to time t. Note that the processing order of MBs in a picture may not necessarily be the same as the actual encoding scan path. $MB_{pic}$ is the total number of MBs in a picture. $B_{pic\_type}(t)$ is the number of bins generated from the coded MBs among all the panels in the picture of pic_type up to time t. $\alpha_{pic\_type}$ is the ratio of the total number of actual bits and the total number of bins for picture of pic_type. $\alpha_{pic\_type}$ is updated after encoding a picture of pic_type. For the first I, $\alpha_{pic\_type}$ is set as 0.75, for the first P, set to be the same as that of the previous I, and for the first B, set to be the same as that of the previous P. $\alpha_{pic\_type}$ is reset at each scene cut. Note that due to the encoding delay, $\alpha_{pic\_type}$ may be calculated a few pictures away in the past.

The above assumes that each MB uses the same nominal number of bits. An alternative embodiment provides for weighing the bit budget per MB according to its need. For example, $$d_{pic\_type}(t) = d_{pic\_type}(0) + \alpha_{pic\_type} \times B_{pic\_type}(t) - \frac{\sum_{i=0}^{MB_{pic\_type}(t)} act_i}{total\_act} T_{pic\_type},$$

where $act_i$ is the local activity measure of MB(i), $$total\_act = \sum_i act_i,$$

and the index i is over all the MBs in the current picture. Another way of determining the virtual buffer fullness is by the equation $$d_{pic\_type}(t) = d_{pic\_type}(0) + \alpha_{pic\_type} \times B_{pic\_type}(t) - \frac{\sum_{i=0}^{MB_{pic\_type}(t)} cost_i}{total\_cost} T_{pic\_type},$$

where costs is the cost measure of MB(i) (often used in mode decision), and $$total\_cost = \sum_i cost_i,$$

and the index i is over all the MBs in the current picture. The above two options tend to distribute the bits over MBs of a picture according to their need. The initial values of the virtual buffer fullness are set as $d_{pic\_type}(0)$=bit_rate/pic_rate. Note that frame and field pictures maintain separate sets of virtual buffer fullness. The quantization stepsize at time t is set proportional to the fullness of virtual buffer as, $Q_{pic\_type}(t)$=51×(pic_rate/bit_rate)×$d_{pic\_type}(t)$. The quantization stepsize, $Q_{pic\_type}(t)$, is then converted into the reference quantization parameter by $QP_{pic\_type}(t)$=[6×$\log_2(Q_{pic\_type}(t))$+c] where constant c is set to a value of 4 [1].

The same reference quantization parameter, $QP_{pic\_type}(t)$, is now applied to all the current MBs of the panels of the current pictures of pic_type I, P and/or B in frame or field.

Interval for Updating Reference QP: The central DSP checks the virtual buffer fullness at a constant, or variable, interval. The interval may be set around an average time for processing one or several MBs. At each checking time instant, say t, the central DSP receives the information on the number of MBs that have been processed since the last checking time from each of the panels of the current (one, two or three) pictures of pic_type I, P and/or B, and the associated bit, or bin, counts of the processed MBs. Note that due to the complexity of each MB as well as the possible different coding modes assigned, panels may not necessarily sync at processing their current MBs. Hence, at time t, panels may give slightly different numbers of the processed MBs, that is, 1, 0, or other numbers. The central DSP then re-computes the virtual buffer fullness $d_{pic\_type}(t)$ for all the three picture types of pic_type I, P and B, and determines the new reference quantization parameters, $QP_{pic_{13}\_type}(t)$. The new $QP_{pic\_type}(t)$ are sent back to all the panels of the current pictures of pic__type I, P and/or B. The $QP_{pic\_type}(t)$ is used for the next MBs until a new QP is received.

Adaptive Quantization: The reference quantization parameter, $QP_{pic\_type}(t)$ is further modulated per MB by the MB's spatial local activity at each panel. The spatial local activity measure of MB (j) in frame or field mode is computed using the original pixel values of the MB, that is, $act_j$=1+min(var_block$_k$|k=1,2, . . ., 2×(16/n)×(16/m)), where var_block$_k$ is the variance of MB/sub_MB partition (k), defined as $$\text{var\_block}_k = \frac{1}{n \times m} \sum_{i,j=0}^{n,m} (x_k(i,j) - \text{mean\_block}_k)^2,$$

$$\text{mean\_block}_k = \frac{1}{n \times m} \sum_{i,j=0}^{n,m} x_k(i,j)$$

and $x_k(i, j)$ are the original pixel values of MB/sub_MB partition (k). Normalized local activity is given by $$N\_act_j = \frac{\beta \times act_j + \text{avg\_act}}{act_j + \beta \times \text{avg\_act}},$$

where β is a constant and avg_act is the average value of $act_j$ of the picture. The reference quantization parameter $QP_{pic\_type}(t)$ determined in rate control is modulated by $N\_act_j$, giving the final $QP_j$ for MB (j) in frame or field mode, that is, $QP_j=QP_{pic\_type}(t)+6\times\log_2(N\_act_j)$. The range of modulation is controlled by β. For example, in one embodiment, β is set to a value of 2. The final $QP_j$ may need to be further clipped into the allowable range of [0,51].

Additional Buffer Protection: Assume that buffer_delay and decoder_buffer_size are the buffer delay and the decoder buffer size, respectively. The encoder buffer size can be set as buffer_size=min(buffer_delay, decoder_buffer_size). To prevent the overflow and underflow of both the encoder and decoder buffers, the target number of bits determined for the current picture in bit allocation, $T_{pic\_target}$, may need to be checked. It is further assumed that the bits generated per picture are moved into the encoder buffer during an interval of 0 second, and the bits are moved out the encoder buffer at a constant rate of bit_rate/pic_rate Assume that buffer_occupany is the buffer occupancy of the encoder buffer. Before encoding a picture, the target number of bits assigned for the picture is checked and, if necessary, adjusted as follows: if buffer_occupany+$T_{pic\_target}$>α×buffer_size, then $T_{pic\_target}$=α×buffer_size−buffer_occupancy, and if buffer_occupancy+$T_{pic\_target}$−bit_rate/pic_rate<(1−α)×buffer_size, then $T_{pic\_target}$=(1−α)×buffer_size−buffer_occupancy+bit_rate/pic_rate, where α is a constant, and can be set, for example, to be between 0.90 and 0.95

It is understood that this multi-panel rate control method for real-time video encoders may also be applied in other type of encoders. Those skilled in the art will appreciate that the various adaptations and modifications of the preferred embodiments of this method and apparatus can be configured without departing from the scope and spirit of the present method and apparatus. Therefore, it is to be understood that, within the scope of the appended claims, the present method and apparatus may be practiced other than as specifically described herein.

What is claimed:

1. A method for panel-based rate control for encoding real-time digital video, comprising:
    performing bit allocation by assigning and updating a target rate for a group of pictures (GOP), and computing a target rate for a picture of type I, P or B in frame or field within said GOP from said target rate of said GOP, where said picture is processed on multiple panels; and
    performing rate control by adjusting guantization parameters to achieve said target rates
    protecting both encoder and decoder buffers from overflowing or underflowing before encoding a picture, wherein protecting the encoder buffers comprises checking and adjusting the target number of bits assigned for a picture according to the following two conditions: if buffer_occupancy +$T_{pic\_target}$>α×buffer_size, then $T_{pic\_target}$=α×buffer_size−buffer_occupancy; and if buffer_occupancy+$T_{pic\_target}$−bit-rate/pic_rate<(1−α)×buffer_size, then $T_{pic\_target}$=(1−α)×buffer_size−buffer_{occupancy+bit}_rate/pic_rate.

2. The method of claim 1, wherein the step of bit allocation further comprises budgeting a nominal number of bits ($R_{GOP\_nnominal}$) determined by the equation $$R_{GOP\_nominal} = N_{GOP} \times \frac{\text{bit\_rate}}{\text{pic\_rate}}$$

for a group of pictures (GOP), where $N_{GOP}$ is the length of the GOP, bit_rate is a target bit rate in bits per second, and pic_rate is a picture rate in pictures per second.

3. A method for panel-based rate control for encoding real-time digital video, comprising:

performing bit allocation by assigning and updating a target rate for a group of pictures (GOP), and computing a target rate for a picture of type I, P or B in frame or field within said GOP from said target rate of said GOP, where said picture is processed on multiple panels, wherein a central DSP computes said target rate for said picture of type intra picture (I), predictive coded picture (P), or bi-directional predictive coded picture (B), using the expressions $$T_{pic\_type} = \frac{K_{pic\_type} C_{pic\_type} R_{GOP\_remaining}}{K_I n_{pic\_I} C_{pic\_I} + K_P n_{pic\_P} C_{pic\_P} + K_B n_{pic\_B} C_{pic\_B}}$$

for frame pictures, and $$T_{pic\_type} = \frac{K_{pic\_type} C_{pic\_type} R_{GOP\_remaining}}{K_I n_{field1} C_{field1} + K_P (n_{field0\_P} C_{field0\_P} + n_{field1\_P} C_{field1\_P}) + K_B n_{field\_B} C_{field\_B}}$$

for field pictures, and performing rate control by adjusting guantization parameters to achieve said target rates.

4. The method of claim 1 wherein the step of bit allocation further comprises initializing and updating the complexity measures of frame and field pictures of type I, P and B.

5. The method of claim 1 wherein the step of rate control further comprises updating the picture numbers of picture type I, P and B ($N_I$, $N_P$, and $N_B$).

6. A method for panel-based rate control for encoding real-time digital video, comprising:

performing bit allocation by assigning and updating a target rate for a group of pictures (GOP), and computing a target rate for a picture of type I, P or B in frame or field within said GOP from said target rate of said GOP, where said picture is processed on multiple panels; and performing rate control by adjusting guantization parameters to achieve said target rates, wherein the step of rate control further comprises determining six virtual buffer fullnesses, one for each picture of type I, P or B in frame or field, at a time instant t is using the expression $$d_{pic\_type}(t) = d_{pic\_type}(0) + \alpha_{pic\_type} \times B_{pic\_type}(t) - \frac{MB_{pic\_type}(t)}{MB_{pic}} T_{pic\_type};$$

or the expression $$d_{pic\_type}(t) = d_{pic\_type}(0) + \alpha_{pic\_type} \times B_{pic\_type}(t) - \frac{\sum_{i=0}^{MB_{pic\_type}(t)} act_i}{\text{total\_act}} T_{pic\_type},$$

if the bit budget per MB is assigned according to its need, where $act_i$ is the local activity measure of MB(i)

$$\text{total\_act} = \sum_i act_i,$$

and the index i is over all the MBs in the current picture; or the expression $$d_{pic\_type}(t) = d_{pic\_type}(0) + \alpha_{pic\_type} \times B_{pic\_type}(t) - \frac{\sum_{i=0}^{MB_{pic\_type}(t)} cost_i}{\text{total\_cost}} T_{pic\_type},$$

where $cost_i$ is the cost measure of MB(i) and $$\text{total\_cost} = \sum_i cost_i.$$

7. The method of claim 1, wherein the step of bit allocation further comprises handling scene changes in a GOP.

8. The method of claim 6, wherein a central DSP maintains and updates said six virtual buffers, and determines six quantization parameters, $QP_{pic\_type}$, proportional to six virtual buffer fullnesses, one for each of the picture types I, P and B in frame or field.

9. The method of claim 8, wherein the central DSP sends the six quantization parameters to all the current pictures of I, P or B.

10. The method of claim 9, wherein the same quantization parameter is applied to all the panels (panel based architecture) in a picture until a new quantization parameter is received.

11. The method of claim 10, wherein a final quantization parameter for a macroblock (MB) j in frame or field mode in each panel is determined by using the expression $QP_j = QP_{pic\_type}(t) + 6 \times \log_2(N\_act_j)$ where $N\_act_j$ is the normalized local activity of MB j.

12. The method of claim 7, wherein no action occurs if a scene change occurs within a GOP and an I picture in the GOP is in a new scene, otherwise a first P picture in the new scene is changed to an I picture.

13. The method of claim 7, wherein a short or long GOP ("Irregular GOP") is created and followed by a regular GOP.

14. The method of claim 13, wherein the length of the Irregular GOP is between 0.5 to 1.5 times the regular GOP length.

15. The method of claim 12, wherein the first P picture in the new scene is the Nth picture of the GOP.

16. The method of claim 15, wherein, if the first P picture is in the first half of the GOP, then the scheduled I picture in the GOP is changed to a P picture.

17. The method of claim 16, wherein the long and short GOPs, with lengths determined by the expressions $N_{GOP}=N_{GOP}+(N-N_{sub\_GOP})$ and $N_{GOP}=N_{GOP}-(N-N_{sub\_GOP})$, respectively, are created.

18. The method of claim 17, wherein the long GOP is followed by the short GOP.

19. The method of claim 17, wherein the corresponding GOP lengths for I, P and B frame and field pictures are determined by the expressions recited in claim 17 using an updated GOP length.

20. The method of claim 17, wherein the nominal numbers of bits for the long and short GOPs are determined using the expressions $$R_{GOP\_nominal} = R_{GOP\_nominal} + \frac{N - N_{sub\_GOP}}{N_{GOP}} \times R_{GOP\_nominal} \text{ and}$$

$$R_{GOP\_nominal} = R_{GOP\_nominal} - \frac{N - N_{sub\_GOP}}{N_{GOP}} \times R_{GOP\_nominal},$$

respectively.

21. The method of claim 15, wherein, if the first P in the new scene is in the second half of the GOP, then the scheduled I picture in the next GOP is changed to a P picture.

22. The method of claim 21, wherein the short and long GOPs with lengths determined by the expressions $N_{GOP}=N-N_{sub\_GOP}$ and $N_{GOP}=2 \times N_{GOP}-(N-N_{sub\_GOP})$, respectively, are created.

23. The method of claim 22, wherein the short GOP is followed by the long GOP.

24. The method of claim 23, wherein the corresponding GOP lengths for I, P and B frame and field pictures are determined by the expressions recited in claim 24 using an updated GOP length.

25. The method of claim 23, wherein the nominal numbers of bits for the long and short GOPs are determined using the expression $$R_{GOP\_nominal} = \frac{N - N_{sub\_GOP}}{N_{GOP}} \times R_{GOP\_nominal} \text{ and}$$

$$R_{GOP\_nominal} = 2 \times R_{GOP\_nominal} = \frac{N - N_{sub\_GOP}}{N_{GOP}} \times R_{GOP\_nominal},$$

respectively.

26. A video data coding-apparatus comprising:
a processor;
an input/output device;
a memory; and
a video encoding module that performs bit allocation by assigning a target number of bits per GOP, performs rate control by adjusting the quantization parameter QP to achieve said target number of bits, and performs adaptive quantization by modulating the quantization parameter using the local activity measure wherein the step of rate control further comprises determining six virtual buffer fullnesses, one for each picture of type I, P or B in frame or field, at a time instant t is using the expression $$d_{pic\_type}(t) = d_{pic\_type}(0) + \alpha_{pic\_type} \times B_{pic\_type}(t) - \frac{MB_{pic\_type}(t)}{MB_{pic}} T_{pic\_type};$$

or the expression $$d_{pic\_type}(t) = d_{pic\_type}(0) + \alpha_{pic\_type} \times B_{pic\_type}(t) - \frac{\sum_{i=0}^{MB_{pic\_type}(t)} act_i}{total\_act} T_{pic\_type},$$

if the bit budget per MB is assigned according to its need, where $act_i$ is the local activity measure of MB(i), $$total\_act = \sum_i act_i,$$

and the index i is over all the MBs in the current picture; or the expression $$d_{pic\_type}(t) = d_{pic\_type}(0) + \alpha_{pic\_type} \times B_{pic\_type}(t) - \frac{\sum_{i=0}^{MB_{pic\_type}(t)} act_i}{total\_cost} T_{pic\_type},$$

where $cost_i$ is the cost measure of MB(i) and $$total\_cost = \sum_i cost_i.$$

27. The video data coding apparatus of claim 26, wherein the video encoding module checks and adjusts the target number of bits assigned for a picture to prevent the system from overflowing and underflowing.

28. The video data coding apparatus of claim 26, wherein the video encoding module budgets a nominal number of bits for a GOP, assigns each picture of type I, P, or B a target number of bits, and initializes and updates the complexity measures of frame and field pictures.

29. The video data coding apparatus of claim 26, wherein the video encoding module updates the picture numbers of picture type I, P or B, determines the fullness of six virtual buffers, and maintains and updates said virtual buffers.

30. The video data coding apparatus of claim 26, wherein the video encoding determines the quantization parameter for the MB in frame or field mode and modulates said quantization parameter using a local activity measure.

31. The video data coding apparatus of claim 26, wherein the video encoding module generates, updates, and applies six quantization parameters to all the panels in a picture of type I, P or B.

32. The video coding apparatus of claim 26, wherein the video encoding module is capable of handling scene changes.

33. The method of claim 3, wherein the step of bit allocation further comprises budgeting a nominal number of bits ($R_{GOP\_nominal}$) determined by the equation $$R_{GOP\_nominal} = N_{GOP} \times \frac{bit\_rate}{pic\_rate}$$

for a group of pictures (GOP), where $N_{GOP}$ is the length of the GOP, bit_rate is a target bit rate in bits per second, and pic_rate is a picture rate in pictures per second.

34. The method of claim 3, wherein the step of bit allocation further comprises initializing and updating the complexity measures of frame and field pictures of type I, P and B.

35. The method of claim 3, wherein the step of rate control further comprises updating the picture numbers of picture type I, P and B ($N_I$, $N_P$, and $N_B$)

36. The method of claim 6, wherein the step of bit allocation further comprises budgeting a nominal number of bits ($R_{GOP\_nominal}$) determined by the equation $$R_{GOP\_nominal} = N_{GOP} \times \frac{\text{bit\_rate}}{\text{pic\_rate}}$$

for a group of pictures (GOP), where $N_{GOP}$ is the length of the GOP, bit_rate is a target bit rate in bits per second, and pic_rate is a picture rate in pictures per second.

37. The method of claim 6, wherein the step of bit allocation further comprises initializing and updating the complexity measures of frame and field pictures of type I, P and B.

38. The method of claim 8, wherein the step of rate control further comprises updating the picture numbers of picture type I, P and B ($N_I$, $N_P$, and $N_B$)

* * * * *